Patented Aug. 11, 1931

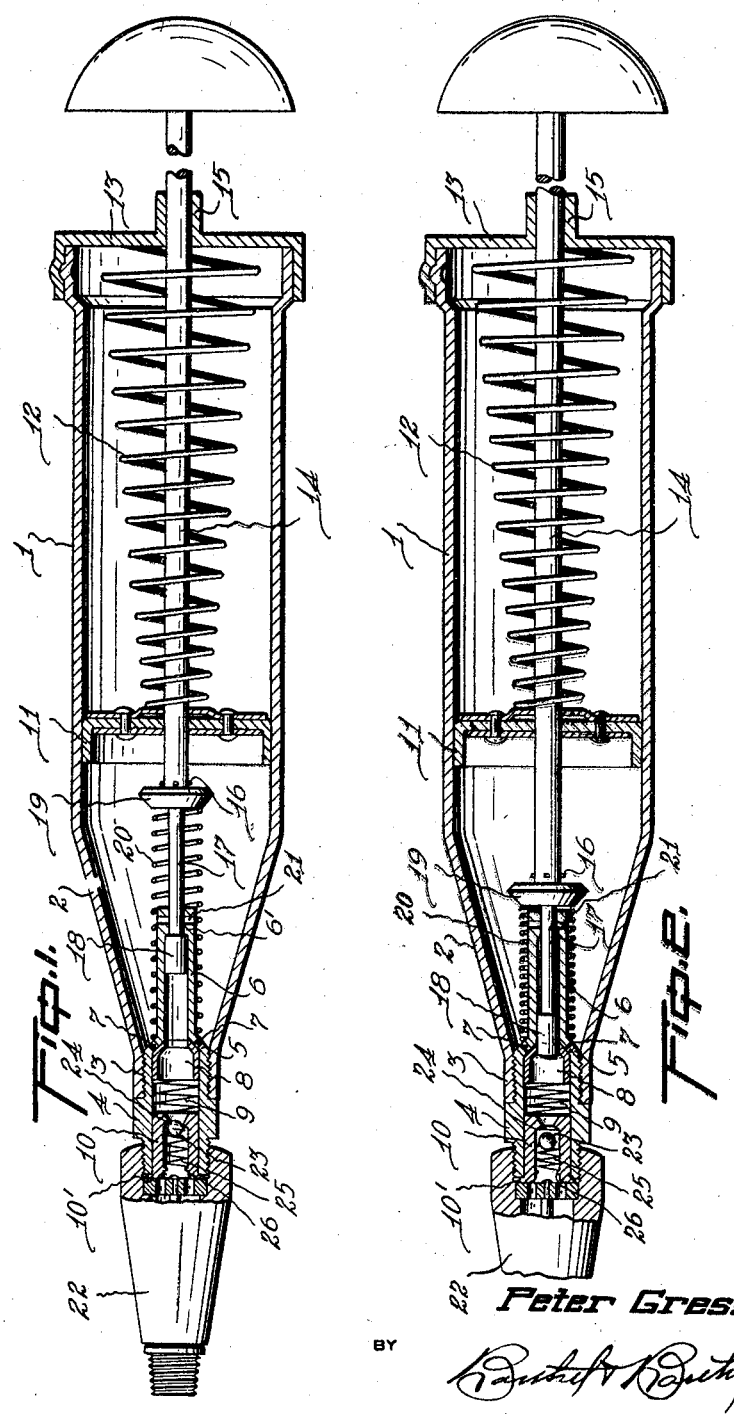

1,818,539

UNITED STATES PATENT OFFICE

PETER GRESSER, OF DETROIT, MICHIGAN

GREASE GUN

Application filed August 31, 1929. Serial No. 389,626.

My invention relates to improvements in a grease gun and lubricating means having particular reference to bearings for motor vehicles.

An object of the present invention is the delivery of a predetermined quantity of lubricant on each operation and novel means for first trapping the lubricant in a confined volume, and then, by a continuous stroke of the plunger of the gun forcing it into the bearing.

A further object of my invention is the provision of novel means of preventing any return flow of the grease after it has been ejected by the piston.

Another object of my invention is the provision of such a structure that is cheap to manufacture and easy to assemble.

With these and other objects in view I make the body or receiver of the device in the form of a cylinder having a piston slidably mounted therein. One side of the piston forms a chamber for containing the lubricant and at the other side is mounted a spring which causes the piston to exert pressure constantly on the lubricant. An outlet chamber, disposed axially of the cylinder having screwthreaded engagement thereto is in communication with the lubricant chamber by means of a valved connection, and therefore receives lubricant therefrom under pressure.

A piston on the end of the ejecting plunger moves in a cylindrical extension portion of the chamber, within certain limits and thus measures the amount of lubricant which may be discharged into the outlet chamber in advance of the plunger. The other end of said outlet chamber member has screwthreaded engagement with a hollow discharge nozzle.

Said screwthreaded outlet chamber member has a series of ports communicating between the lubricant chamber and a reciprocating hollow headed cup shaped spring pressed valve, permitting the lubricant to flow into the cylindrical and main portions of said outlet chamber in advance of the piston. This valve is adapted to close when the small piston is moved for the purpose of expelling the lubricant and to open on the suction stroke of said piston.

The invention is fully disclosed by way of example in the following description and in the accompanying drawings, in which—

Figure 1 represents a longitudinal section of the gun in its normal inactive position, coupled to the nozzle and fitting shown in elevation;

Figure 2 is a cross sectional view corresponding to Figure 1, illustrating the small piston at the end of its discharge stroke.

Reference to these views will now be made by use of like characters which are employed to designate corresponding parts throughout.

The body of the device comprises a cylinder 1 which tapers at 2 towards its outlet end and is there internally threaded at 3. A hollow outlet member 4 is screwed into the internally threaded outlet end 3, and said hollow outlet member tapers as at 5, and protruding from said tapering portion is a cylindrical portion 6 disposed axially of the cylinder 1. Said tapered portion 5 is provided with a series of ports 7. Mounted in said hollow outlet member is a perforated thimble shaped spring pressed valve 8, normally held in port-closing position by a light compression spring 9, which abuts against a sleave 10 having a flanged portion 10′, held in said member as hereinafter described.

Within the cylinder 1 is a piston 11 normally forcing the lubricant toward the outlet end of the gun by means of a spring 12 which also bears against a cap 13 covering the inlet end of the cylinder. A plunger rod 14 is slidably mounted in the axis of the cylinder, and is supported centrally of the piston and in a central boss 15 formed as a part of the cap 13. Forwardly of the piston 11 the plunger rod has a series of lugs 16, which prevent withdrawal of the plunger rod through the piston, and a stem 17 is adapted to be operated thereby and extends a considerable distance forwardly into the cylindrical portion 6 of the outlet member 4, and an enlarged end of said stem serves as a piston 18.

The stem 17 has a collar 19, recessed to receive the end of the plunger 14 and which collar serves as an abutment for a comparatively strong spring 20 which surrounds the stem 17 and the cylindrical portion 6 of the outlet member, and is supported at its other end upon the tapered portion 5 of said outlet member 4, and said spring retracts the plunger 14, and the piston 18.

When the gun is filled with grease and the piston 18 is withdrawn to the position shown in Figure 1, the lubricant under pressure of the spring 12 passes through the ports 7, said pressure, aided by the suction stroke of the plunger, overcoming the pressure exerted by the small light spring 9, pushes the reciprocating valve 8 from its port-closing position, and serves to fill the cylindrical portion 6 and the outlet member 4 with grease. When pressure is applied to the handle of the plunger rod 14, the piston 18 is moved from the position shown in Figure 1 to that shown in Figure 2, and the pressure of the grease in the cylindrical portion 6 and the outlet member 4 forces the valve 8 to seal itself against the inclined portion 5 of the hollow member 4, thus preventing the inflow of grease through the ports 7, and thus delivering a predetermined quantity of grease.

The cylindrical portion 6 has an internally shouldered portion 6' against which the piston 18 abuts on the completion of its suction stroke and which prevents withdrawal of the piston from its cylinder by the retractive force exerted by the spring 20.

In order to provide a quick release for any grease around stem 17 upon the suction stroke of the piston 18, a series of holes 21 are drilled in the shouldered portion 6' of the cylinder 6.

On the discharge end of the screwthreaded outlet member 4 is screwed a coupling member or nozzle 22 provided with suitable coupling means, and being adapted to press against the flanged portion 10' of the sleeve 10 thereby holding it in place.

Said flanged sleeve 10 is provided with a ball check valve 23, having a valve seat 24, and spring 25, which spring is mounted between an internal flange 26 and the ball check valve and normally closes said valve, thus preventing a return flow of grease from the nozzle.

Although a specific embodiment of the invention has been illustrated and described, it will be understood that various alterations in the details of construction may be made without departing from the scope of the invention as indicated by the appended claims.

What I claim is:

1. A grease gun comprising a cylinder having a grease containing chamber, a spring pressed piston, a plunger rod slidable through said piston, lugs on said plunger rod to prevent its withdrawal through said piston, a second cylinder and a second piston slidable therein, operating means for said second piston cooperating with said plunger rod, a hollow outlet member having a tapering portion supporting said second named cylinder and being engaged by the outlet end of the first named cylinder, ports in said tapered portion of the outlet member communicating with the grease containing chamber, a perforated cup shaped valve mounted in said hollow outlet member, a spring adapted to normally hold said valve in port closing position, a sleeve mounted in the opposite end of said outlet member having a spring pressed check valve mounted therein, and means for holding said sleeve in the discharge end of said hollow outlet member.

2. A grease gun comprising a cylinder having a grease containing chamber, a spring pressed piston, a plunger rod slidable through said piston, lugs on said plunger rod to prevent its withdrawal through said piston, a second cylinder and a second piston slidable therein, operating means for said second piston cooperating with said plunger rod, a hollow outlet member having a tapering portion supporting said second named cylinder and being engaged by the outlet end of the first named cylinder, ports in said tapered portion of the outlet member communicating with the grease containing chamber, a perforated cup shaped valve mounted in said hollow outlet member, a spring adapted to normally hold said valve in port closing position, a flanged sleeve mounted in the opposite end of said outlet member having a spring pressed check valve mounted therein, and a discharge nozzle engaging said hollow outlet member provided with means adapted to hold said flanged sleeve in the outlet end of said hollow outlet member.

3. A grease gun comprising a cylinder having a grease containing chamber, a spring pressed piston, a plunger rod slidable through said piston and provided with means preventing its withdrawal through said piston, a recessed collar adapted to receive said plunger rod, a stem projecting from said collar and having an enlarged end acting as a second piston, a hollow outlet member engaged by the outlet end of the first named cylinder and provided with a tapered portion supporting a second cylinder, in which said second named piston reciprocates, disposed axially of and extending into said first named cylinder, said second cylinder having an inwardly shouldered portion preventing the withdrawal of said second piston therefrom, ports communicating between the grease chamber and said hollow discharge member and permitting the flow of grease into said second cylinder, a spring around said stem and said second cylinder disposed between the recessed collar and the tapered portion of the hollow outlet member, a perforated cup shaped valve mounted in said hollow outlet member, a spring adapted to normally hold said valve in port closing position, a sleeve mounted in the discharge end of said hollow outlet member having a spring pressed check valve mounted therein, and means for holding said sleeve in the discharge end of said hollow outlet member.

4. A grease gun comprising a cylinder having a grease containing chamber, a spring pressed piston, a plunger rod slidable through said piston and provided with means preventing its withdrawal through said piston, a recessed collar adapted to receive said plunger rod, a stem projecting from said collar and having an enlarged end acting as a second piston, a hollow outlet member engaged by the outlet end of the first named cylinder and provided with a tapered portion supporting a second cylinder, in which said second named piston reciprocates, disposed axially of and extending into said first named cylinder, said second cylinder having an inwardly shouldered portion preventing the withdrawal of said second piston therefrom, ports communicating between the grease chamber and said hollow discharge member and permitting the flow of grease into said second cylinder, a spring around said stem and said second cylinder disposed between the recessed collar and the tapered portion of the hollow outlet member, a perforated cup shaped valve mounted in said hollow outlet member, a spring adapted to normally hold said valve in said port closing position, a flanged sleeve mounted in the discharge end of said hollow outlet member having a spring pressed check valve mounted therein, and a discharge nozzle engaging said hollow outlet member provided with means adapted to hold said flanged sleeve in the outlet end of said hollow outlet member.

5. A lubricating device comprising a cylinder, a hollow outlet member adapted for connection to a nozzle, valve means mounted in said outlet member adapted to prevent a return flow of lubricant therethrough, ports in said outlet member communicating directly with said cylinder, a second cylinder extending from the outlet member on the inner side of said ports and partially into said first named cylinder, a reciprocating piston in said second named cylinder, a passageway between said second cylinder and said outlet member, a cone-shaped hollow cylindrical spring-pressed valve member concentrically pierced to permit said reciprocating piston to pass therethrough, serving to control the flow of lubricant from the first named cylinder into the second named cylinder upon the suction stroke of said reciprocating piston and from the outlet member into the discharge nozzle upon the pressure stroke of said reciprocating piston.

In testimony whereof I affix my signature.

PETER GRESSER.